US011072151B2

(12) United States Patent
Soon

(10) Patent No.: US 11,072,151 B2
(45) Date of Patent: *Jul. 27, 2021

(54) LAMINATED GLASS COMPRISING PRESSURE-SENSITIVE ADHESIVE ON THE EXTERNAL SURFACE THEREOF

(71) Applicant: SAINT-GOBAIN GLASS FRANCE, Courbevoie (FR)

(72) Inventor: Jia-Mei Soon, L'Hay les Roses (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 128 days.

This patent is subject to a terminal disclaimer.

(21) Appl. No.: 15/778,888

(22) PCT Filed: Nov. 28, 2016

(86) PCT No.: PCT/FR2016/053110
§ 371 (c)(1),
(2) Date: May 24, 2018

(87) PCT Pub. No.: WO2017/093643
PCT Pub. Date: Jun. 8, 2017

(65) Prior Publication Data
US 2018/0345629 A1 Dec. 6, 2018

(30) Foreign Application Priority Data

Nov. 30, 2015 (FR) ...................................... 1561561

(51) Int. Cl.
*B32B 7/12* (2006.01)
*B32B 17/10* (2006.01)
*B32B 37/12* (2006.01)
*B32B 37/30* (2006.01)

(52) U.S. Cl.
CPC .. *B32B 17/10064* (2013.01); *B32B 17/10431* (2013.01); *B32B 17/10467* (2013.01); *B32B 17/10504* (2013.01); *B32B 17/10522* (2013.01); *B32B 17/10532* (2013.01)

(58) Field of Classification Search
CPC .............................................. B32B 17/10036
See application file for complete search history.

(56) References Cited

U.S. PATENT DOCUMENTS

| 3,585,381 A * | 6/1971 | Hodson | B41M 5/281 349/21 |
|---|---|---|---|
| 6,271,956 B1 * | 8/2001 | Saxe | G02B 1/10 359/296 |
| 7,704,342 B2 * | 4/2010 | Bourcier | B32B 17/10 156/103 |
| 2006/0263596 A1 * | 11/2006 | Bamborough | B32B 7/06 428/354 |
| 2009/0176101 A1 * | 7/2009 | Greenall | B32B 17/1077 428/412 |
| 2010/0060985 A1 * | 3/2010 | Kamada | B32B 17/10036 359/487.06 |
| 2015/0202846 A1 * | 7/2015 | Byker | C23C 14/086 428/141 |
| 2015/0246507 A1 * | 9/2015 | Brown | B32B 17/10 428/215 |
| 2016/0282645 A1 * | 9/2016 | Wang | B32B 17/10761 |

FOREIGN PATENT DOCUMENTS

EP 2 013 013 B1 1/2010
WO WO-2013125646 A1 * 8/2013 ............. G02B 5/208

OTHER PUBLICATIONS

Machine translation, Otani et al., WO2013125646A1 (Year: 2013).*
International Search Report as issued in International Patent Application No. PCT/FR2016/053110, dated Mar. 23, 2017.
International Preliminary Report on Patentability and the Written Opinion of the International Searching Authority as issued in International Patent Application No. PCT/FR2016/053110, dated Jun. 5, 2018.

* cited by examiner

*Primary Examiner* — Sheeba Ahmed
(74) *Attorney, Agent, or Firm* — Pillsbury Winthrop Shaw Pittman LLP

(57) ABSTRACT

A laminated glazing includes a first glass sheet, a first interlayer sheet made of thermoplastic polymer; optionally a solar-protection sheet or functional metal layer having reflective properties in the infrared region and/or in the solar radiation region; a sheet of pressure-sensitive adhesive, in direct contact with a heat-sensitive functional sheet; a second glass sheet; the first glass sheet being in direct contact with the interlayer sheet; the second glass sheet being in direct contact with the sheet of pressure-sensitive adhesive; the sheet of pressure-sensitive adhesive and the second glass sheet are in direct contact at the external face of the latter.

17 Claims, 1 Drawing Sheet

Figure 1A:
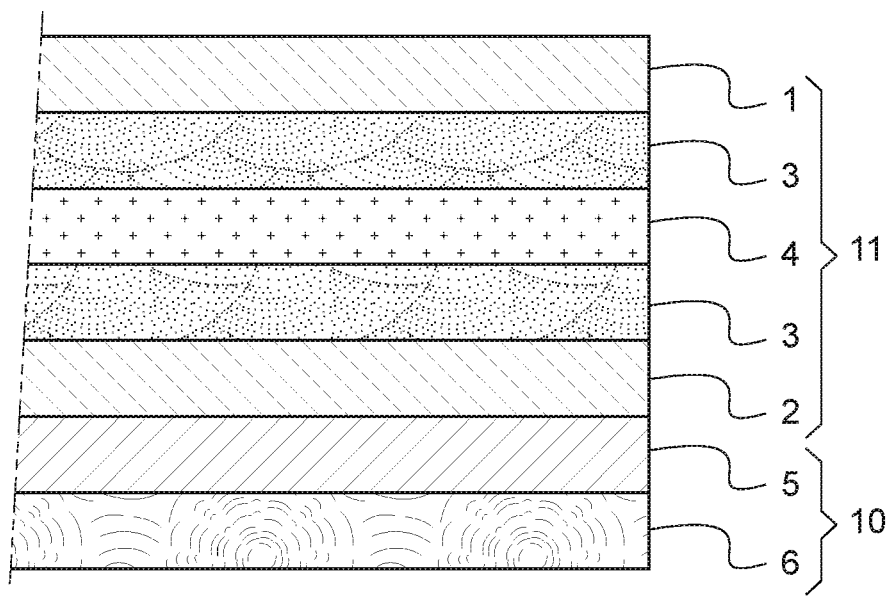

LAMINATED GLASS COMPRISING PRESSURE-SENSITIVE ADHESIVE ON THE EXTERNAL SURFACE THEREOF

CROSS-REFERENCE TO RELATED APPLICATIONS

This application is the U.S. National Stage of PCT/FR2016/053110, filed Nov. 28, 2016, which in turn claims priority to French patent application number 1561561 filed Nov. 30, 2015. The content of these applications are incorporated herein by reference in their entireties.

The invention relates to a laminated glazing comprising a stack of thin layers, including (i) at least two glass substrates assembled together by (ii) at least one interlayer of organic nature and (iii) at least one heat-sensitive functional layer combined with the external face of one of said glass substrates by (iv) a layer of pressure-sensitive adhesive. Advantageously, this glazing is electrically switchable.

The invention also relates to the use of such a glazing to manufacture a glazing intended to equip a vehicle, in particular chosen from a motor vehicle, a bus, a truck, a boat, an aircraft, such as a plane or a helicopter, and a train.

The two glass substrates of said glazing are optionally held together by a frame structure. The laminated glazing of the invention can thus be a vehicle glazing chosen from a windshield, a front side glazing, a rear side glazing, a rear window and a roof glazing. Advantageously, it is a roof glazing.

The interlayers are provided in the form of films. These are generally films made of polyvinyl butyral, abbreviated to PVB, or ethyl/vinyl acetate, abbreviated to EVA. PVB has the advantage of exhibiting a good adhesion to glass and a high degree of elongation before tearing.

The laminated glazing comprising such a plastic interlayer thus proves to be impact-resistant. During impact with a foreign body, the glass crazes and the fracture remains localized at the point of impact without detrimental effect in the visibility through the glazing. In addition, the PVB interlayer keeps the pieces of glass in place, which reduces the risk of being cut by glass splinters and makes it possible to retain the leaktightness of the glazing. Finally, the residual energy of the body is absorbed by this interlayer. The glazing thus prevents the body from passing through, if the impact is not disproportionate.

The main stages of the process for the manufacture of a laminated glazing are as follows:

Washing the glass: The glass substrate is cut out beforehand and optionally shaped. In order to remove any traces of contamination, the glass is washed with ionized water and carefully dried.

Assembling: It is carried out in a dust free closed chamber at a temperature of 18-20° C. and with a relative humidity of the atmosphere of 30%. The layers of glass and of interlayer are superposed as a function of the desired composition. The trimming of the laminated volume is carried out before entering the preheated oven.

Degassing: This is the most critical operation. It is a matter of removing the air trapped, in the form of possible air bubbles, between the interlayer and the glass sheet and of sealing the edges of the assembly so as to prevent any risk of penetration of air during the final autoclaving operation. This operation is carried out by double calendering with a preheating oven at approximately 60° C. The temperature conditions are a function of the type of assembly and of the speed of the line.

Autoclaving: The definitive adhesive bonding of the glass and the interlayer is carried out in an autoclave at a high pressure and with a rise in temperature in order to ensure strong bonding of the assembly.

Thus, for an interlayer made of PVB, the operation is carried out at a pressure between 10 and 12 bar, limits included, and at a temperature of 120 to 145° C., limits included. This makes it possible to sufficiently creep the PVB to perfectly match the surface of the glass and create adhesion.

For an interlayer made of EVA, the adhesive bonding is carried out at a temperature slightly below 100° C. The cycle times are a function of the filling and of the composition of the laminated glazing.

Cleaning: A second peripheral trimming is necessary in order to remove the excess interlayer, due to the creep.

However, in the case where it is desired to manufacture a laminated glazing comprising functional intermediate layers, the temperature at which the adhesive bonding has to take place can present a problem. The adhesive bonding of the interlayer film or films of the glazing during the lamination phase has to take place, very often, at a temperature which is difficult to render compatible with the use of other layers, in particular of "functional" layers, which are sensitive to the temperature. This is because many functional coatings experience permanent damage to their function by the exposure to such autoclaving temperatures.

Currently, in order to manufacture such a laminated glazing in just one hot lamination stage, without causing a loss of functionality to the functional layer, an interlayer made of EVA is used in place of PVB, the EVA exhibiting a processing temperature or adhesive bonding temperature for carrying out the lamination which is much lower than that of PVB.

However, the PVB layer remains essential due to its impact strength in numerous applications. It is thus impossible to carry out the manufacture of a laminated glazing exhibiting a heat-sensitive functional coating with just one high-temperature lamination stage.

The result of this is a two-step lamination process developed by Saint-Gobain. In this process, which forms part of the prior art, (i) a PVB layer is, during a first hot lamination stage, applied at a temperature which can reach 120° C. to a glass sheet intended to form the side of the glazing in contact with the exterior space of the vehicle, then the assembly can be combined, for example with other sheets, such as a metal sheet, which offer additional functionalities, and finally (ii) an active film, for example a film for a suspended particle device, abbreviated to SPD, is added in a second hot lamination stage at a temperature of less than 100° C., said film being rendered integral by EVA with the glass layer intended to form the side of the glazing in contact with the interior space of the vehicle and with the laminate comprising the PVB of the preceding stage. In this way, the SPD film is never exposed to the high lamination temperature required for the processing of the PVB.

Only a process including at least two hot lamination stages is thus currently possible for the lamination of a laminated glazing comprising at least one layer of PVB and of SPD. However, this process requires several handling operations, cannot be carried out continuously and thus consumes time and energy.

The aim of the invention is to succeed in overcoming the disadvantages of the prior art by developing a novel type of laminated glazing stack, the layers of which adhere effectively to one another, while reconciling a sensitization to heat and an impact strength.

Another important aim of the invention is to provide a process for the manufacture of such a stack and, by extension, of a laminated glazing comprising such a stack which is economically advantageous.

The applicant company has developed an impact-resistant laminated glazing exhibiting at least one heat-sensitive active film which can now be produced in a single hot lamination stage employing at least one polymeric interlayer.

A subject matter of the invention is thus a laminated glazing comprising:
- a first glass sheet 1;
- at least one interlayer sheet 3 made of thermoplastic polymer; said first glass sheet 1 being in direct contact with said interlayer sheet 3;
- optionally a "solar-protection" sheet 4 or functional metal layer having reflective properties in the infrared region and/or in the solar radiation region;
- optionally a second interlayer sheet 3 when said "solar-protection" sheet 4 is present;
- a second glass sheet 2; and
- at least one sheet of pressure-sensitive adhesive 5, in direct contact with a heat-sensitive functional sheet 6;
- said second glass sheet 2 being in direct contact with said sheet of pressure-sensitive adhesive 5.

The sheet of pressure-sensitive adhesive 5 and the second glass sheet 2 are in direct contact at the external face of this second glass sheet.

The two faces of one and the same glazing are each in contact with an external medium. These external media are each distributed on either side of said glazing.

Within the meaning of the invention, the "external" face of a layer or of a sheet means the face of said layer or of said sheet of the glazing closest to the closest external medium.

Within the meaning of the invention, the "internal" face of a layer or of a sheet means the face of said layer or of said sheet of the glazing furthest from the closest external medium.

Within the meaning of the invention, the terms "sheet", "film" or "layer" will be used without distinction in the present invention to define the different strata of the structure of the laminated glazing according to the invention. These terms have the same meaning here.

Advantageously, the first glass sheet 1 of said glazing is in direct contact with the external medium of the latter, which is the medium external to the vehicle having such a laminated glazing which is a subject matter of the invention. Respectively, the second glass sheet 2 of said glazing is in direct contact with the external medium of the latter which proves to be the medium internal to the vehicle, that is to say the medium where the driver and the possible passengers are found.

According to a first embodiment of the invention represented in FIG. 1a, the laminated glazing according to the invention successively comprises:
- a first glass sheet (1),
- a first interlayer sheet (3) made of thermoplastic polymer,
- a "solar-protection" sheet (4) or functional metal layer having reflective properties in the infrared region and/or in the solar radiation region,
- a second interlayer sheet (3) when said "solar-protection" sheet (4) is present,
- a second glass sheet (2),
- a sheet of pressure-sensitive adhesive (5),
- a heat-sensitive functional sheet (6).

Figure 1B:
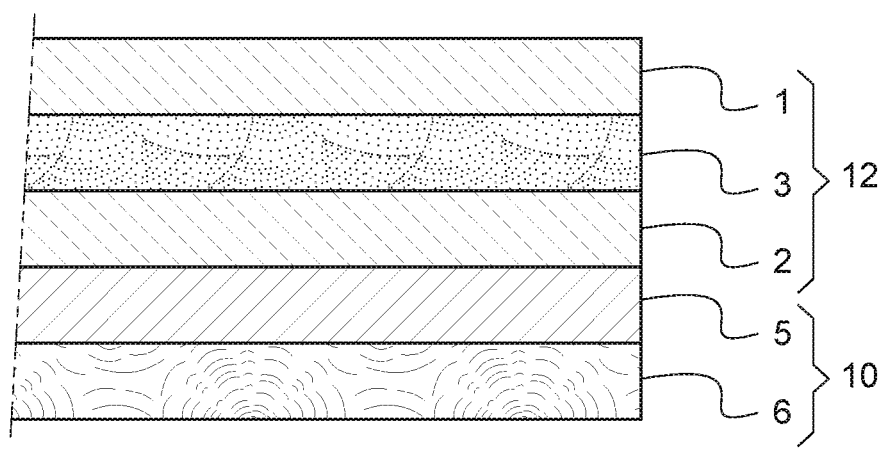

According to a second embodiment of the invention represented in FIG. 1b, the laminated glazing according to the invention comprises:
- a first glass sheet (1),
- an interlayer sheet (3) made of thermoplastic polymer,
- a second glass sheet (2),
- a sheet of pressure-sensitive adhesive (5),
- a heat-sensitive functional sheet (6).

These embodiments are not, of course, limiting.

According to the invention, the thermoplastic polymer of the interlayer sheet 3 is advantageously chosen from polyvinyl butyral, polyurethane, ethylene/vinyl acetate and ionomers.

According to the invention, the thermoplastic polymer of the interlayer sheet 3 is advantageously PVB.

According to the invention, the pressure-sensitive adhesive is advantageously chosen from pressure-sensitive adhesives based on acrylates and pressure-sensitive adhesives based on silicone.

According to the invention, the heat-sensitive functional sheet 6 is advantageously based on encapsulated liquid crystals, on electrophoretic particles dispersed in the medium, on particles dispersed in an electrophoretic fluid or on particles for the polarization of light.

According to the invention, the "solar-protection" sheet is advantageously made of silver or any other metal having light-reflecting properties or a metal or metal compound having light-absorbing properties. Mention may be made, as examples, of the Solargard® reflective products from Saint-Gobain, such as LX70, and the Ceramic Series absorbing products from Huper Optik®, such as Huper Optik® C5.

According to the invention, the laminated glazing can be flat or bent.

In addition, it is advantageously a vehicle glazing chosen from a windshield, a front side glazing, a rear side glazing, a rear window and a roof glazing.

In particular, it can be a glazing for a vehicle chosen from a motor vehicle, a train, a truck, a plane and a bus.

Another subject matter of the invention is a process for the manufacture of a laminated glazing as defined above, in which the stages of installing the different sheets take place starting (i) from the installing of the interlayer sheet 3 made of thermoplastic polymer on the internal face of the first glass sheet 1, or starting (ii) from the installing of a sheet of pressure-sensitive adhesive 5 on one of the two faces of a heat-sensitive functional sheet 6 or else starting (iii) from the installing of a sheet of pressure-sensitive adhesive 5 on the external face of the second glass sheet 2.

The process for the manufacture of a laminated glazing according to the invention comprises:
- at least one stage of installing an interlayer sheet 3 made of thermoplastic polymer on the internal face of a first glass sheet 1, optionally bent beforehand,
- optionally the installation of a "solar-protection" sheet 4 on the face which has remained vacant of said interlayer sheet 3, which is thus sandwiched between said first glass sheet 1 and said optional "solar-protection" sheet 4, and the installation of a second interlayer sheet 3 on the face which has remained vacant of said "solar-protection" sheet 4, which is thus sandwiched between a first interlayer sheet 3 and a second interlayer sheet 3,
- then at least the installation of a second glass sheet 2 on the face which has remained vacant of the first interlayer sheet 3 when said second interlayer sheet 3 and said "solar-protection" sheet 4 are absent, so as to form a partial laminate 12, and the installation of a second glass sheet 2 on the face which has remained vacant of the second interlayer sheet 3 when said second interlayer sheet 3 and said "solar-protection" sheet 4 are present, so as to form another partial laminate 11, and/or at least one stage of installing a sheet of pressure-sensitive adhesive 5 on one of the two faces of a heat-sensitive functional sheet 6, so as to form a partial laminate 10.

The embodiments described below made it possible in particular to obtain the stacks according to the invention as represented in FIGS. 1a and 1b.

Said partial laminate 11 or 12 can subsequently be applied, at the face which has remained vacant of its second glass sheet 2, on or under said partial laminate 10 at the vacant face of its sheet of pressure-sensitive adhesive 5.

According to the invention, the process for the manufacture of the laminated glazing can comprise, in addition, at least:

a stage of degassing the resulting laminate under vacuum, with use of a peripheral seal or of a vacuum bag, optionally one stage of heat sealing of the edges of said laminate, and one autoclaving stage.

The process can additionally comprise at least one calendering stage, optionally one hot calendering stage.

The invention also relates to the use of a glazing as defined above to manufacture a vehicle glazing chosen from a windshield, a front side glazing, a rear side glazing, a rear window and a roof glazing and/or to manufacture a glazing for a vehicle chosen from a motor vehicle, a train, a truck, an aircraft and a bus.

The glass substrate of the laminated glazing according to the invention can be of the type sold under the Planiclear® or Planitherm® trade name by Saint-Gobain, indeed even VG10. Its thickness will be chosen as a function of the use envisaged.

The glazing according to the invention comprises at least one sheet of pressure-sensitive adhesive.

A pressure-sensitive adhesive, abbreviated to PSA and commonly called self-adhesive, is an adhesive which forms a bond when a pressure is applied to it so as to render the adhesive integral with a surface to be adhesively bonded. Neither solvent nor water nor heat is necessary to activate the adhesive. It is used in motor vehicle trims and in a great variety of other products.

As indicated by its name of "pressure-sensitive", the degree of bonding between a given surface and the self-adhesive binder is influenced by the amount of pressure used to apply the adhesive to the target surface. Other factors are also involved and are important for good adhesion, such as softness, surface energy and removal of contaminants.

PSAs are generally designed to form a bond and to maintain the latter at ambient temperature. A person skilled in the art will take care to choose a self-adhesive adhesive formulation suited to the conditions of its use. This is because PSAs generally experience a reduction in or disappearance of their adhesion at low temperature and experience a reduction in their ability to withstand shearing at elevated temperatures.

PSAs are generally based on an elastomer coupled with an appropriate additional adhesive agent or "tackifying" agent (for example an ester resin).

The elastomers can be based:

1/ on acrylates, which may be sufficiently sticky not to require an additional tackifying agent, 2/ on nitriles, 3/ on silicone, requiring special tackifying agents, such as silicate resins of "MQ" type composed of monofunctional trimethylsilane ("M") which has reacted with quadrifunctional silicon tetrachloride ("Q"). PSAs based on silicone are, for example, polydimethylsiloxane gums and resins dispersed in xylene or a mixture of xylene and toluene, 4/ on block copolymers based on styrene, such as styrene-butadiene-styrene (SBS), styrene-ethylene/butylene-styrene (SEBS), styrene-ethylene/-propylene (SEP) or styrene-isoprene-styrene (SIS) block copolymers, 5/ on vinyl ethers.

Advantageously, the pressure-sensitive adhesive in accordance with the invention is chosen from PSAs based on acrylates and PSAs based on silicone.

These adhesives are sold in the form of double sided adhesive rolls.

Mention may be made, as PSAs based on silicone, of the Dow Corning® adhesives, such as 2013 Adhesive, 7657 Adhesive, Q2-7735 Adhesive, Q2-7406 Adhesive, Q2-7566 Adhesive, 7355 Adhesive, 7358 Adhesive, 280A Adhesive, 282 Adhesive, 7651 Adhesive, 7652 Adhesive or 7356 Adhesive.

The laminated glazing according to the invention also comprises, in addition, a heat-sensitive functional sheet.

It can be a suspended particle device (SPD) film or a laminate of such a film, in which the film comprises substrates coated, on a portion at least of their internal surface, (i) with a conductive polymer, such as, for example, polythiophene, or (ii) with an inorganic conductive layer, such as, for example, indium tin oxide, in order to act as electrode means. The polymer can be applied in the form of an aqueous composition comprising, in addition to the polymer, at least one solvent and at least one binder. A preferred conductive polymer based on polythiophene is a polyethylenedioxythiophene (PEDT) polymer. The polymer can be doped with polystyrenesulfonate. The polymer electrodes can be connected to a conductive material which extends beyond an external limit of the film to connect the film to an appropriate voltage source.

Mention may also be made of the films which comprise a polymer matrix and exhibit droplets of a liquid light modulator suspension containing a plurality of particles dispersed in a liquid medium in suspension distributed within the matrix. Said medium in suspension (a) is virtually immiscible with the polymer matrix, (b) has, at atmospheric pressure, a boiling point greater than approximately 100° C., (c) has an electrical resistivity of at least approximately $0.8 \times 10^6$ ohms per square and (d) has a refractive index at 25° C. which differs by not more than approximately 0.002 from that of the polymer matrix, measured at virtually the same temperature. The suspension medium includes at least one liquid compound selected from the group encompassing methylpyrrolidinone, ethylpyrrolidinone, dimethyl malonate, diethyl malonate, dimethyl succinate, di(propylene glycol) methyl ether, dimethylphthalate, butyl phthalyl butyl glycolate, ethyl lactate, propylene carbonate, dimethyl perfluorosuberate, dimethyl tetrafluorosuccinate, tetra(ethylene glycol) dimethyl ether, tri(ethylene glycol) dimethyl ether, di(ethylene glycol) dimethyl ether, ethylene glycol phenyl ether, epoxidized linseed oil, epoxidized soybean oil, diethyl isophthalate, a laurate ester based on silicone copolyol, a copolymer of silicone copolyol, an ester of silicone copolyol, an isostearate ester based on silicone copolyol, a pelargonate ester based on silicone copolyol, dimethyl octofluoroadipate and also corresponding mixtures and, optionally, at least one previously known liquid suspension medium. The polymer matrix can optionally be crosslinked to form the film in order to produce a crosslinked polymer matrix.

Such a film comprising a suspended particle device is appropriate for being used as light modulator of a laminated glazing according to the invention.

It can also optionally be a film containing encapsulated particles dispersed in a suspension or electrophoretic fluid. Said fluid can be a mixture of two or more than two fluids or else a single fluid. Furthermore, these particles can themselves contain a liquid and be dispersed in a suspension fluid. In any case, the suspension fluid can have a density or a refractive index, the values of which are substantially suited to those which characterize the particles dispersed in the fluid. They can in particular be colored polymer particles preferably having a surface functionality of retention of the charges. In electrophoretic media, it is advantageous to use pigment particles comprising polymer shells comprising from 0.1 to 5 percent in moles of repeat units resulting from a fluorinated acrylate monomer or from a fluorinated methacrylate monomer. The polymer specifically has a branched-chain structure, with side chains which extend from a main chain.

The conductor fluid can be colored. It can comprise a polar solvent and a colorant chosen from a pigment and/or a dye. The colored conductor fluid should not cause electrical failure of a dielectric in the device in which it is employed. An agent for controlling electrical conductivity can optionally be added to the colored conductor fluid.

The application of electric fields in a glazing, provided with such a film, by electrophoresis makes it possible to influence the optical properties of said glazing.

In addition, the glazing can be a glazing having available an electrochromic system comprising electrically conductive layers, separated by a layer of an electrochromic material, an electrolyte and a counterelectrode, said electrically conductive layers each being provided with an electrically conductive strip made of a material having an electrical conductivity which is high with respect to that of the electrically conductive layers, the electrically conductive strips being positioned along opposite edges of the glazing and being connected to a voltage generator which applies, in the coloration phase (or respectively in the decoloration phase), a difference in potential between two points A and B respectively belonging to the electrically conductive layers and in the immediate vicinity of the electrically conductive strips. Advantageously, the electrically conductive strips are made of copper and are welded to the conductive electrode as defined above, the layer of an electrochromic material consists of a cathodic electrochromic material, such as, for example, tungsten trioxide, the counterelectrode consists of an anodic electrochromic material, such as, for example, iridium oxide, and/or the electrolyte is a proton conducting electrolyte, such as, for example, a polymeric complex of polyethylene oxide and orthophosphoric acid which is anhydrous, or a lithium ion or proton ($H^+$) conducting electrolyte.

Mention may thus be made, for example, of viologens and conductive polymers, such as polyaniline or PAni.

Finally, mention also be made of functional films based on liquid crystals dispersed in a polymer matrix known under the abbreviated acronym PDLCs. Liquid crystals dispersed in a polymer matrix are a category of heterogeneous materials consisting of a dispersion of microdroplets of liquid crystals in a solid and more or less flexible polymer matrix. These materials exhibit electrooptical properties. This is because they can switch between a highly diffusive opaque state (OFF state) and a transparent state (ON state) after application of an electric field.

The PDLC system is employed in switchable windows. It has several advantages, such as ease of manufacture, ease of use on a large scale, stability, speed of their response time and the fact of not requiring the use of polarizers which absorb almost half the incident light.

Different mesophases can be used to prepare these materials: the nematic phase, the cholesteric phase and the A and C* smectic phases.

The principle of the electrooptical systems using a PDLC consists of a composite sandwiched between two electrodes consisting of glass plates, one face of which is covered with a transparent conductive layer of indium tin oxide (ITO). In the absence of an electric field, the mean orientation of the liquid crystal molecular directors in the liquid crystal is random. The difference in refractive index between the segregated liquid crystal and the macromolecular matrix results in a material having a milky and opaque appearance which will scatter light (OFF state).

During the application of an electric field between the electrodes of the cell, the molecular directors become oriented in the direction of the field. A beam of normal index passes through the droplets with a refractive index equal to n0, the ordinary index of liquid crystal molecules. If this index is close to that of the polymer matrix, the film appears clear and transparent (ON state).

Compared with standard laminated glazings, the electrically switchable glazing provides specific additional functions which are reflected in terms of user comfort, light transmission and energy savings. The switchable glazing can rarely be installed directly as a finished product. Typically, before use of the switchable glazing, a prelamination is necessary. For example, for use of an SPD film in the context of the sunroof of a motor vehicle, it is necessary to produce a laminate between at least 2 sheets of clear or tinted glass and PVB. This is done in order to meet the safety standards in the event of the glass breaking and to extend the lifetime of the SPD film.

The laminated glazing according to the invention additionally comprises at least one polymeric interlayer sheet. The interlayer is made of organic polymer. This polymer can in particular be made of polyvinyl butyral, abbreviated to PVB, of ethylene/vinyl acetate, abbreviated to EVA, or of polyurethane or be based on ionomers.

Mention may be made, as examples of ionomers, of the Sentryglass® products sold by DuPont®. Advantageously, PVB is concerned.

The laminated glazing according to the invention can optionally comprise, finally, a "solar-protection" sheet, also known as solar control sheet.

A type of stack of layers which is known to confer "solar-protection" properties on the substrates comprises (i) at least one functional metal layer having properties of reflection in an infrared region and/or in the solar radiation region, in particular a functional metal layer based on silver or on silver-containing metal alloy, and/or a functional layer having properties of absorption in the solar radiation region and/or in the infrared region.

Solar radiation is composed of ultraviolet radiation and of visible light. In this type of stack, the functional layer is thus positioned between two dielectric coatings each comprising at least one dielectric layer which are each made of a dielectric material of the nitride or oxide type. Mention may be made, for example, of silicon, aluminum, Nb, Ti, InSn and SnZn nitrides and oxides.

Mention may preferably be made of silicon nitride, niobium oxide and titanium oxide.

Mention may be made, as examples of solar control film, of the Solargard® reflective products from Saint-Gobain, such as LX70, and the Ceramic Series absorbing products from Huper Optik®, such as Huper Optik® C5.

From the optical viewpoint, the aim of these coatings, which frame the functional metal layer, is "to render antireflective" this functional metal layer.

"Coating" within the meaning of the present invention should be understood as meaning that there may be just one layer or several layers of different materials inside the coating.

As a reminder, the solar factor of a glazing is the ratio of the total solar energy entering the premises through this glazing to the total incident solar energy, and the selectivity S corresponds to the ratio of the light transmission $T_{Lvis}$ in the visible region of the glazing to the solar factor FS of the glazing and is such that: $S=T_{Lvis}/FS$.

Furthermore, these glazings can be incorporated in glazings exhibiting specific functionalities, such as, for example, heated glazings.

As usual, "dielectric layer" within the meaning of the present invention should be understood as meaning that, from the viewpoint of its nature, the material is "nonmetallic", that is to say is not a metal. In the context of the invention, this term denotes a material exhibiting an n/k ratio over the entire wavelength range of the visible region (from 380 nm to 780 nm) which is equal to or greater than 5. It is known to a person skilled in the art that n is the refractive index and k is a constant specific to a given medium characterizing a material.

The physical thickness of said functional metal layer is preferably between 5 nm and 20 nm, including these values, in order to achieve an emissivity <2.5%.

In another specific version of the invention, said dielectric coating positioned or located between the face of the substrate and said functional metal layer comprises a layer having a high refractive index made of a material exhibiting a refractive index of between 2.3 and 2.7, this layer preferably being based on oxide. The refractive index values indicated in the present document are the values measured as usual at the wavelength of 550 nm.

This high-index layer preferably exhibits a physical thickness of between 5 and 15 nm.

This high-index layer makes it possible to maximize the high light transmission in the visible region of the stack and has a favorable effect on neutral colors being obtained, both in transmission and in reflection.

The physical thickness of said dielectric layer based on Nb oxide and/or on Ti oxide nitrite is preferably between 10 and 60 nm.

In another specific version of the invention, the functional metal layer is deposited directly on an underblocker coating positioned between the functional metal layer and the dielectric coating underlying the functional layer and/or the functional layer is deposited directly under an overblocker coating positioned between the functional metal layer and the dielectric coating overlying said functional metal layer and the underblocker coating and/or the overblocker coating comprises a thin layer (i) based on metal chosen from nickel, titanium, chromium, gold, copper and their alloys and (ii) exhibiting a physical thickness t' such that 0.2 nm≤t'≤2.5 nm. Mention may be made, as alloy, of NiCr.

In another specific version of the invention, the final layer of the overlying dielectric coating, the one furthest from the substrate, is based on oxide, preferably deposited substoichiometrically, and in particular is based on titanium oxide ($TiO_x$) or based on mixed zinc tin oxide ($SnZnO_x$).

The substrates of the glazing according to the invention are capable of undergoing a heat treatment without damage for the stack of thin layers. They are thus optionally bent and/or tempered.

It is possible, with the invention, to manufacture a laminated glazing comprising at least one PVB layer and at least one heat-sensitive functional layer in a single stage of lamination by autoclaving.

The use of a PSA layer simplifies the manufacture and reduces the cost with respect to the use of EVA.

In addition, the mechanical strength of the stack according to the invention is very good. Furthermore, the general chemical behavior of this stack is good overall.

The invention claimed is:

1. A laminated glazing comprising:
   a first glass sheet;
   a first interlayer sheet made of thermoplastic polymer, said first glass sheet being in direct contact with said first interlayer sheet;
   optionally a solar-protection sheet or functional metal layer having reflective properties in the infrared region and/or in the solar radiation region;
   optionally a second interlayer sheet when said solar-protection sheet is present;
   a second glass sheet; and
   at least one sheet of pressure-sensitive adhesive, in direct contact with a heat-sensitive functional sheet;
   said second glass sheet being in direct contact with said sheet of pressure-sensitive adhesive, and
   said sheet of pressure-sensitive adhesive and said second glass sheet being in direct contact at the external face of the latter,
   wherein said heat-sensitive functional sheet is a film including encapsulated liquid crystals, electrophoretic particles dispersed in a medium, or particles dispersed in an electrophoretic fluid, the heat-sensitive functional sheet having a first main face and a second main face that is opposite the first main face, wherein the first main face is in direct contact with said sheet of pressure-sensitive adhesive and said second main face is in direct contact with an outside environment of the laminated glazing, and wherein said heat-sensitive functional sheet is laminated to said laminated glazing only via the first main face using said sheet of pressure-sensitive adhesive.

2. The laminated glazing as claimed in claim 1, successively comprising:
   the first glass sheet,
   the first interlayer sheet made of thermoplastic polymer,
   the solar-protection sheet or functional metal layer having reflective properties in the infrared region and/or in the solar radiation region,
   the second interlayer sheet,
   the second glass sheet,
   the sheet of pressure-sensitive adhesive, and
   the heat-sensitive functional sheet.

3. The laminated glazing as claimed in claim 1, comprising:
   the first glass sheet,
   the first interlayer sheet made of thermoplastic polymer,
   the second glass sheet,
   the sheet of pressure-sensitive adhesive,
   the heat-sensitive functional sheet.

4. The laminated glazing as claimed in claim 1, wherein the thermoplastic polymer of the first interlayer sheet is chosen from polyvinyl butyral, polyurethane, ethylene/vinyl acetate and ionomers.

5. The glazing as claimed in claim 1, wherein the thermoplastic polymer of the first interlayer sheet is PVB.

6. The laminated glazing as claimed in claim 1, wherein the pressure-sensitive adhesive is chosen from pressure-sensitive adhesives based on acrylates and pressure-sensitive adhesives based on silicone.

7. The laminated glazing as claimed in claim 1, wherein the solar-protection sheet is made of silver or any other metal having light-reflecting properties or a metal or metal compound having light-absorbing properties.

8. The laminated glazing as claimed in claim 1, wherein the laminated glazing is flat or bent.

9. The laminated glazing as claimed in claim 1, wherein the laminated glazing is a vehicle glazing chosen from a windshield, a front side glazing, a rear side glazing, a rear window and a roof glazing.

10. The laminated glazing as claimed in claim 1, wherein the laminated glazing is a glazing of a vehicle chosen from a motor vehicle, a train, a truck, a plane and a bus.

11. A process for the manufacture of a laminated glazing as claimed in claim 1, comprising stages of installing the different sheets, wherein the stages take place starting (i) from the installing of the first interlayer sheet made of thermoplastic polymer on the internal face of the first glass sheet, or starting (ii) from the installing of a sheet of pressure-sensitive adhesive on the external face of the second glass sheet or starting (iii) from the installing of a sheet of pressure-sensitive adhesive on one of the two faces of a heat-sensitive functional sheet.

12. The process for the manufacture of a laminated glazing as claimed in claim 1, comprising:
   at least one stage of installing the first interlayer sheet made of thermoplastic polymer on the internal face of the first glass sheet, optionally bent beforehand,
   optionally the installation of the solar-protection sheet on the face which has remained vacant of said first interlayer sheet, which is thus sandwiched between said first glass sheet and said optional solar-protection sheet, and the installation of the second interlayer sheet on the face which has remained vacant of said solar-protection sheet, which is thus sandwiched between the first interlayer sheet and the second interlayer sheet,
   then at least the installation of a second glass sheet on the face which has remained vacant of the first interlayer sheet when said second interlayer sheet and said solar-protection sheet are absent, so as to form a partial laminate, and the installation of a second glass sheet on the face which has remained vacant of the second interlayer sheet when said second interlayer sheet and said solar-protection sheet are present, so as to form another partial laminate, and/or
   at least one stage of installing a sheet of pressure-sensitive adhesive on one of the two faces of a heat-sensitive functional sheet, so as to form a partial laminate.

13. The process as claimed in claim 12, wherein said partial laminate is subsequently applied, at the face which has remained vacant of the second glass sheet, on or under said partial laminate at the vacant face of the sheet of pressure-sensitive adhesive.

14. The process for the manufacture of a laminated glazing as claimed in claim 11, additionally comprising:
   a stage of degassing the resulting laminate under vacuum, with use of a peripheral seal or of a vacuum bag,
   optionally a stage of heat sealing of the edges of said laminate, and
   an autoclaving stage.

15. The process for the manufacture of a laminated glazing as claimed in claim 11, additionally comprising at least one calendering stage, optionally a hot calendering stage.

16. A process comprising manufacturing a vehicle glazing chosen from a windshield, a front side glazing, a rear side glazing, a rear window and a roof glazing and/or manufacturing a glazing for a vehicle chosen from a motor vehicle, a train, a truck, an aircraft and a bus, with a laminated glazing as claimed in claim 1.

17. The laminated glazing as claimed in claim 1, wherein the heat-sensitive functional sheet is based on electrophoretic particles dispersed in a medium, or on particles dispersed in an electrophoretic fluid.

* * * * *